US009058251B1

(12) United States Patent
Dorwin et al.

(10) Patent No.: US 9,058,251 B1
(45) Date of Patent: Jun. 16, 2015

(54) DETECTING EXTERNAL SOFTWARE UPDATE FAILURE OF LOCAL APPLICATION (71) Applicant: Google Inc., Mountain View, CA (US)

(72) Inventors: David Kimbal Dorwin, Kirkland, WA (US); Glenn Wilson, Los Angeles, CA (US)

(73) Assignee: Google Inc., Mountain View, CA (US)

(*) Notice: Subject to any disclaimer, the term of this patent is extended or adjusted under 35 U.S.C. 154(b) by 204 days.

(21) Appl. No.: 13/802,364

(22) Filed: Mar. 13, 2013

(51) Int. Cl.
*G06F 11/00* (2006.01)
*G06F 11/30* (2006.01)
*G06F 9/445* (2006.01)

(52) U.S. Cl.
CPC ............ *G06F 11/006* (2013.01); *G06F 11/302* (2013.01); *G06F 8/65* (2013.01)

(58) Field of Classification Search
CPC .............. G06F 8/60; G06F 8/65; G06F 8/71; G06F 11/302; G06F 11/368
USPC ............................. 714/38.1, 38.14, 47.1, 47.2
See application file for complete search history.

(56) References Cited

U.S. PATENT DOCUMENTS

| | | | | |
|---|---|---|---|---|
| 6,836,657 | B2 * | 12/2004 | Ji et al. | 455/419 |
| 8,108,734 | B2 * | 1/2012 | Andrews et al. | 714/47.1 |
| 2004/0078734 | A1 * | 4/2004 | Deuter | 714/57 |
| 2008/0267067 | A1 * | 10/2008 | Salazar et al. | 370/235 |
| 2010/0299664 | A1 * | 11/2010 | Taylor et al. | 717/173 |
| 2012/0054535 | A1 * | 3/2012 | Wong | 714/4.1 |
| 2012/0130725 | A1 * | 5/2012 | Cooper et al. | 705/1.1 |

* cited by examiner

*Primary Examiner* — Joseph Kudirka
(74) *Attorney, Agent, or Firm* — McDermott Will & Emery LLP (57) ABSTRACT

A system for detecting external software update failure of an application may receive a request at the application to determine the status of an update mechanism and infrastructure ("updater") associated with the application. The system may determine one or more values written by the updater at a location accessible by the application. The one or more values may include one or more of a first value indicating when a last successful check for updates for the application was completed by the updater and a second value indicating when a last successful update for the application was completed. The system may determine, at the application and based on the one or more values, if an update failure has occurred at the updater. The update failure may include the updater having problems detecting or applying updates. The system may generate a notification when it determines that an update failure has occurred.

19 Claims, 4 Drawing Sheets

DETECTING EXTERNAL SOFTWARE UPDATE FAILURE OF LOCAL APPLICATION

BACKGROUND

Various client software applications provide for automatic updates, using an updater. The updater may be built into the application, run as a separate application, or may be part of the OS. These software updates are important, as they provide various bug fixes and security protection mechanisms and ensure that the functionality and security of the software application is up to date and accurate. However, the client software application updates may fail for a variety of reasons.

Possible reasons that updates may not occur include proxies and firewalls (e.g., in protected environments such as corporate/enterprise environments), OS/platform issues or configuration, updates to the OS/platform/firewall, connection failure, the updater not being installed properly, a disabled updater, the auto-update request not being received or being ignored, a failure to detect an update, and/or scheduler failure. Where the application is unable to connect to the updater or the application and/or the updater are unable to connect to the update server, it is difficult to determine if an update is available. This may put the user in an insecure state where critical security vulnerabilities remain un-patched and the user sees no new bug fixes or enhancements. To ensure that the user is made aware of the possibility of such risks, it may be desirable to detect an updater failure and alert the user when such failure is detected.

SUMMARY

The disclosed subject matter relates to a method for determining whether an update failure has occurred at an update mechanism and infrastructure with regard to an application, the method comprising receiving a request at a software application to determine the status of an update mechanism and infrastructure ("updater") associated with the application. The method further comprising determining one or more values written by the updater at a location accessible by the application, the one or more values including one or more of a first value indicating when a last successful check for updates for the application was completed by the updater and second value indicating when a last successful update for the application was completed. The method further comprising determining, at the application, based on the one or more values, if an update failure has occurred at the updater, wherein the update failure comprises the updater having problems detecting or applying updates for the application and generating a notification when it is determined that an update failure has occurred.

The disclosed subject matter also relates to a system for determining whether an update failure has occurred at an update mechanism and infrastructure with regard to an application, the system comprising one or more processors and a machine-readable medium comprising instructions stored therein, which when executed by the processors, cause the processors to perform operations including determining a first value written by an update mechanism and infrastructure ("updater") at a first location accessible by an application, the first value indicating when a last successful check for updates for the application was completed at the updater, wherein the updater is external to the application. The operations further comprising determining, at the application, whether the first value meets a first set of threshold criteria, the first threshold criteria including at least one threshold value. The operations further comprising determining a second value written by the updater at the location, the second value indicating when a last successful update for the application was completed. The operations further comprising determining, at the application, if the second value meets a second threshold value, if it is determined that the first value does not meet the at least one threshold value. The operations further comprising determining, at the application, that an update failure has occurred at the updater if the second value does not meet the second threshold value, wherein the update failure comprises the updater having problems detecting or applying updates for the application and generating a notification when it is determined that an update failure has occurred.

The disclosed subject matter also relates to a machine-readable medium comprising instructions stored therein, which when executed by a machine, cause the machine to perform operations comprising receiving a request at a software application to determine the status of an update mechanism and infrastructure ("updater") associated with the application. The operations further comprising determining a first value indicating when the application was installed. The operations further comprising determining if the first value meets a first threshold. The operations further comprising determining a second value written by the updater at a first location accessible by an application if the first value does not meet the first threshold, the second value indicating when a last successful check for updates for the application was completed at the updater, wherein the updater is external to the application. The operations further comprising determining, at the application, whether the second value meets a second threshold. The operations further comprising determining a third value written by the updater at the location if it is determined that the second value does not meet the second threshold, the second value indicating when a last successful update for the application was completed. The operations further comprising determining, at the application, if the third value meets a third threshold. The operations further comprising determining, at the application, that an update failure has occurred at the updater if the third value does not meet the third threshold, wherein the update failure comprises the updater having problems detecting or applying updates for the application and generating a notification when it is determined that an update failure has occurred.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides a method and system for detecting that a client software application ("application") is out of date and/or could not be updated, due to a failure of the update mechanism and/or infrastructure (hereinafter generally referred to as the "updater"), and alerting the user. The system may detect an updater failure and may alert the user. Alerting a user of every failure may not be desirable. For example, in some instances, the updater failure may occur because the user is away from the computer, has not yet established a connection to the network or for other reasons which do not necessarily mean that there is an actual problem with the updater. Thus, the system aims to detect when it is probable that there is an actual problem with the updater and alert the user.

In one example, the system detects where there is an updater failure based on heuristic information and/or update frequency. The system, for example, detects the time that has lapsed since the last successful update, and/or since the last successful check for updates and makes a decision as to whether an error or problem has occurred. In the case of a non-built-in updater, this may make use of the functionality, APIs, data, traces, etc., of the external updater.

In one example, the updater may store one or more state information for each software application. Alternatively, a single state value for an application or one or more state values covering all applications handled by the updater (or one or more separate updaters) may be maintained by the updater(s) and/or written at a central location. The state information may be stored at a central location. The central location may be a location independent of and/or different from the updater and/or the application. Both the updater and application may be communicably coupled to and have access to the central location.

The application may access the stored state information to determine whether an issue with the updates exists. For example, the application might check for a "heart beat," which represents a successful update or update check for the application, and display a message when the heart beat has not occurred for a certain period of time. This period of time would be determined by each application. The application will need knowledge of the location where the state information is stored. There is no need for the application to directly check for or be notified of how the updater is functioning and/or whether the updater is installed, or to have a back-up update mechanism, since the state data is written by the updater to a specific location (e.g., a central location that is independent of the updater and/or application) and accessible by the application, independent of the updater.

In one example, the state information includes specific time stamps or counts. This may be more helpful than just storing whether an update or update check was successful (i.e. just failures), because it allows the application to make appropriate decisions about whether, when, and how to display a warning message to the user by assigning specific thresholds, at the application, indicating failure, based on various information known at the application.

In one example, the application may determine if an update failure has occurred based on calculating an overall update score for the updater. The update score may be based on various time stamps and/or counters. In one example, the updater writes one or more time stamps to the storage location. For example, the updater writes the current time to a LastCheckSuccess time stamp value whenever it has completed a successful update check for the application. In one example, the value is written when there is "no update" response or a successful update (e.g., installer completed successfully) either from the silent update worker or an on-demand/manual update. "LastCheckSuccess" is not updated, in one example, if an invalid update response is received or if an update fails.

The application can read this value and based on the difference between the value and the current time, can determine the time lapsed since a successful update check. In one example, the application determines a threshold (e.g., a defined time or period of time) associated with the LastCheckSuccess time stamp. The threshold may be determined based on historical user information, user preferences, system preferences, historical update times, historical update frequency, and other similar information. In another example, the threshold may be a fixed period of time. If the system determines that the length of time lapsed since the last successful update check does not meet the threshold (e.g., is not within the period of time defined by the threshold, or exceeds the threshold time limit), the application may alert the user. In one embodiment, the application may alert more frequently, persistently, and/or conspicuously as the difference between the threshold and LastCheckSuccess value increases.

In one example, the application may, additionally or alternatively, determine whether to alert the user based on the last time an update occurred. In one example, the updater may write an "UpdateTime" value (e.g., time stamp) each time the application is successfully updated, which allows the application to further distinguish between the last time the application was updated and the last time a successful check occurred. For example, an application may want to show a warning if it has been four weeks since an update even if it has only been a week since there was a successful update check. The determination may be based on a specific threshold, determined based on similar information as described above with respect to the LastCheckSuccess threshold. In one example, the determination may be based on a combination of the last successful update value (UpdateTime) and the last successful update check value (LastCheckSuccess). In one example, one or both values may be associated with an upper and lower threshold. In one example, the threshold(s) may be defined based on a time difference (e.g., current time−difference threshold) or the value for one or more of last successful update or last successful update check may be converted to a time difference (e.g., current time−value). In one example, if the upper threshold for one or both values is met, the system proceeds to warn the user. If not, the system then proceeds to determine if the one or both the values meet a lower threshold, and if so, determines if the other value also meets a threshold (same or different from the upper and/or lower threshold) and warns the user when the threshold is met.

Another value which may be taken into account, when determining if an updater failure has occurred at the application is the installation time. In one example, the application may keep track of the last installation of the application, a new version and/or an update to the application. In one example, the system may determine if enough time has lapsed since the last successful installation and may determine a threshold or whether to warn the user when a threshold is met (e.g., for the last update check and/or last update) based on the last successful installation time. For example, if the system determines that the last installation is recent, the application may ignore the fact that the LastCheckSuccess value is not recent and/or does not satisfy a threshold.

Furthermore, an application may use other data, such as how long it has been since the computer has been turned on, the last time the application was launched, last successful connection to the network, whether and when automatic update is enabled, automatic update schedule and other similar information to determine where an update failure has occurred, and further decide where or in what manner or frequency to warn the user.

The type of application may also be considered when determining thresholds, whether an updater failure has occurred and/or when or how the system should warn the user. The application type may be defined by the sensitivity of the application, the update frequency, past security threats, past failures, or other similar information. For example, a browser may want to inform the user immediately for security reasons while other applications may consider it safe to wait a while if the computer has been off for some time.

The above embodiments also work regardless of whether the updater is working (i.e. even if programmatic APIs are not available) and/or whether such APIs are available. In addition, no special distinction is necessary to differentiate between network connectivity issues and failures to apply updates.

Once the application reads the value(s) and determines that an error has occurred, the application may alert the user. For example, the system may alert the user by providing a message for display in the about box. Displaying the message in the about box may be beneficial because it is contextual, since users are likely to be looking for version information regarding the application, but it is out of the way to allow normal user experience. Alternatively, the message may be displayed to the user when the user opens the application or a new window or tab in the application, showing a pop-up window or warning screen, or showing a message as part of the UI displaying the application. In one example, in addition to or in lieu of alerting the user, the application may report the issue to a central manager or server. In one example, the warning message may include a link to a Help Center page that explains the issue and possibly links to the latest offline installer.

In one example, instead of time stamps, the updater may store a count for each of the values described above, and the application may determine whether an update failure has occurred and when and how to alert the user (and/or other entity) based on the counts. While the above embodiments have been described with respect to the application performing the determination, in another example, the updater may handle alerts on its own based on similar algorithms.

Figure 1:
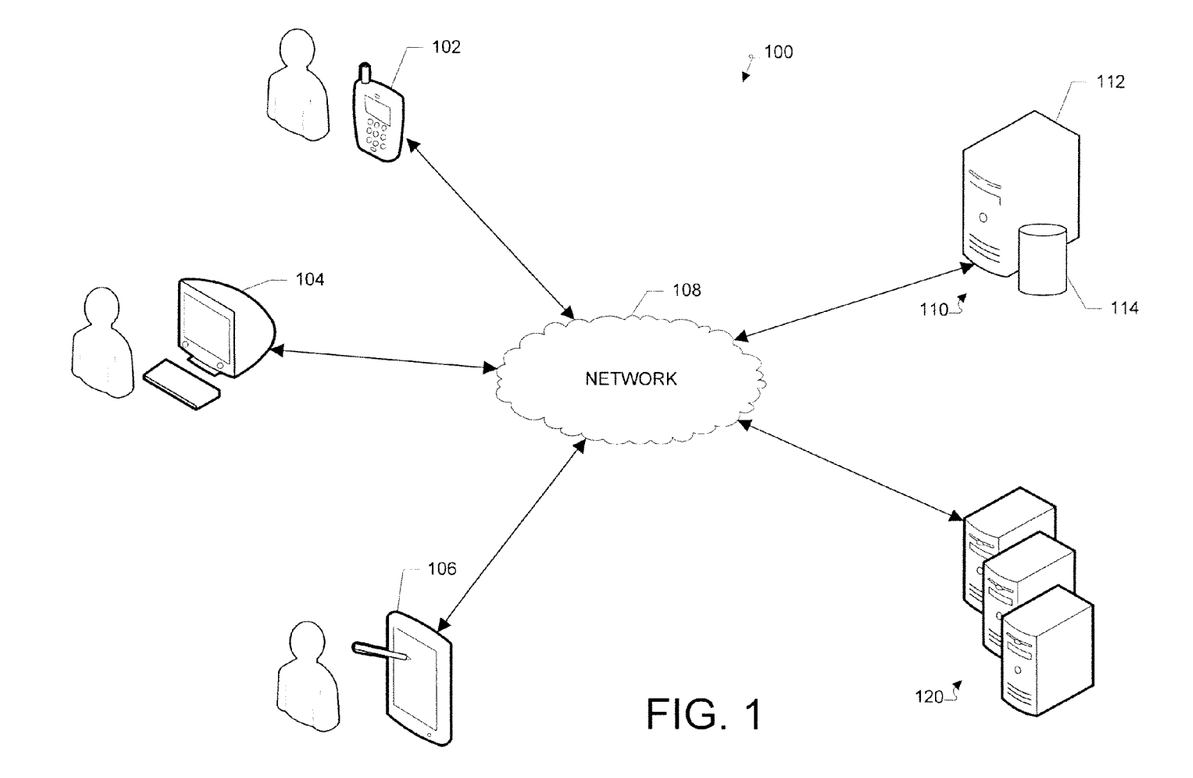
FIG. 1 illustrates an example client-server network environment which provides for facilitating detecting software a failure of an updater providing update to a local application.

FIG. 1 illustrates an example client-server network environment which provides for facilitating detecting software a failure of an updater providing update to a local application. A network environment 100 includes a number of electronic devices 102, 104 and 106 communicably connected to a server 110 by a network 108. One or more remote servers 120 are further coupled to the server 110 and/or the one or more electronic devices 102, 104 and 106. Server 110 includes a processing device 112 and a data store 114. Processing device 112 executes computer instructions stored in data store 114, for example, to assist in detecting software update failure of a local application at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In one example, the electronic devices 102, 104 and 106 store one or more local application(s) (e.g., hosted at local server 110 and/or one or more remote servers 120). In the example of FIG. 1, electronic device 102 is depicted as a smartphone, electronic device 104 is depicted as a desktop computer, and electronic device 106 is depicted as a PDA.

In some example aspects, server 110 and each of the one or more remote servers 120 can be a single computing device such as a computer server. In other embodiments, servers 110 and 120 can represent more than one computing device working together to perform the actions of a server computer (e.g., cloud computing). Server 110 may host the application locally stored at the client device (e.g., electronic devices 102, 104 or 106). The server 110 may host the central storage location for storing update state information accessible by the local application and/or the updater.

Each of the one or more remote servers 120 may host one or more of the central server for storing the update state information, a central manager, the updater, update providers, and/or other similar applications and/or data stores. In one embodiment server 110 and one or more remote servers 120 may be implemented as a single server one or more services (e.g., websites, data providers and/or applications). In one example, the server 110 and one or more remote servers 120 may communicate through the user agent at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
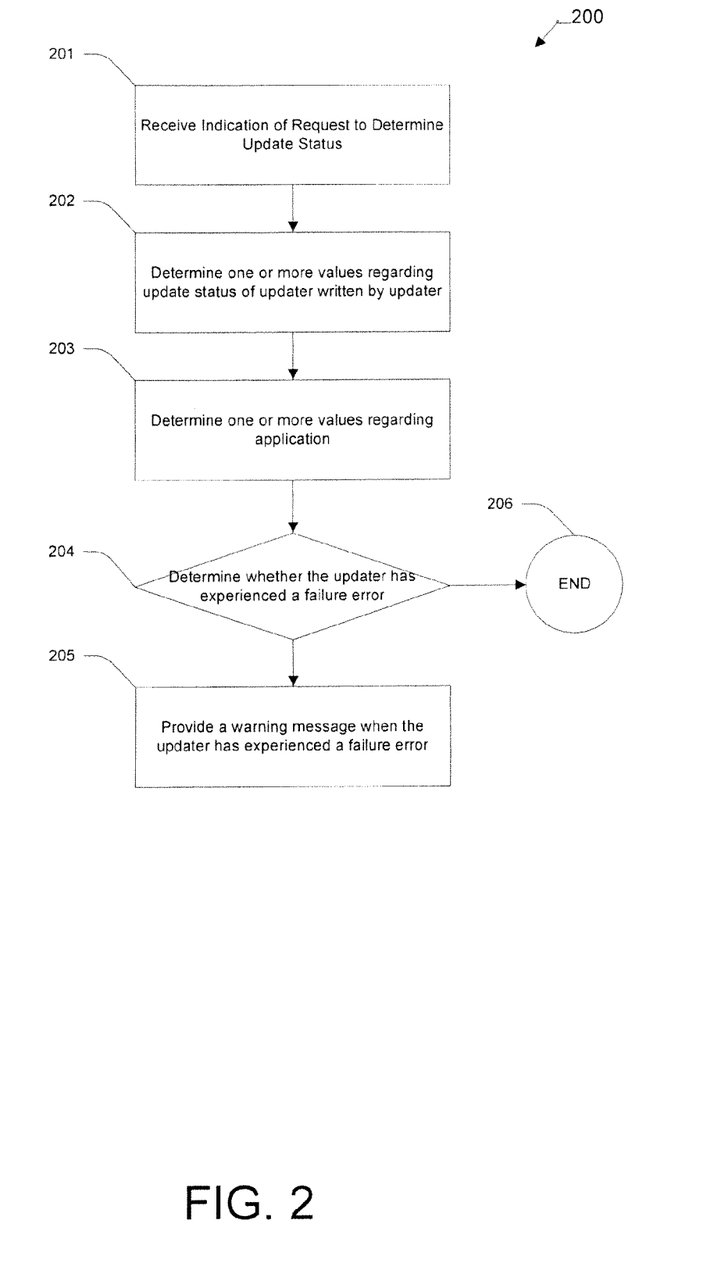
FIG. 2 illustrates a flow diagram of an example process for alerting a user regarding update failure of an updater at a local application.

FIG. 2 illustrates a flow diagram of an example process 200 for alerting a user regarding update failure of an updater at a local application. In step 201, the system receives indication of a request to determine update status. The indication may be received in response to a timer measuring the time lapsed since the last check for update issues at the application, based on detecting that a condition defined by the system, user or administrator for checking the update status of the application has occurred, or by receiving an explicit request. In one example, the update check may be done each time the user accesses an application, requests to view information regarding the application, turns on the client device or otherwise takes an action with respect to the application and/or client device which triggers a request to perform the update check.

In step 202, the system determines one or more values regarding the update status of the application. In one example, the one or more values include one or more time stamps and/or counters indicating information regarding the update status of the application. In one example, one or more of the values determined in step 202 are written by an updater. In one example, the updater includes the mechanism and infrastructure for checking for, retrieving and providing updates for the application. The updater may be external to the application and/or remote from the application (e.g., a non built-in updater). In one example, a single updater may be responsible for updates associated with a single application or multiple applications. In one example, one or more of the values (e.g., those written by an external updater) may be stored at a remote central location (e.g., a location independent of the application and/or the updater). In such instances, the determination may include accessing the central location to retrieve the values.

For example, the updater may write a first LastCheckSuccess value, as a time stamp of the time when the updater performed the last successful update check for the application. The value may be written when the updater checks for an update and receives a successful response, such as a no update or successful update response (e.g., either in response to an automatic/silent updater or an on-demand/manual update). The value may not be written if an invalid response is received or if an update fails.

The updater may further write an UpdateTime value, including a time stamp of the last time an update was received, sent to the application and/or installed at the application. In one example, the updater may write the UpdateTime value each time the application is successfully updated.

In one example, during step 203 (or some other time during process 200), one or more other values may be determined by the system (e.g., values written by the application and/or the updater). In one example, an "InstallTime" value is maintained (e.g., by the application) and represents the time of installation of the application, or an update or new version of the application. Other values and information may include the time at which the client device was turned on, or the time for which the device has been on, the time of the last successful connection to the network, whether and when automatic update is enabled, automatic update schedule and/or other similar information and/or values.

In step 204, the system (e.g., at the local application) determines whether the updater (e.g., an external updater remote from the local application) has experienced a failure error based on one or more of the values determined in step 202 and/or step 203. The determination may for example be based on an overall update score calculate according to one or more of values described above with respect to step 202. In one example, in step 204 the system retrieves one or more threshold values and the determination in step 204 is based on the threshold values. An example process for determining whether an update failure has occurred is described in further detail with respect to FIG. 3.

In step 205, the system provides a warning for display to the user if, in step 204, the system determines that an updater failure has occurred. For example, the system may alert the user by providing a message for display in the about box associated with the application. Displaying the message in the about box may be beneficial because it is contextual, since users are likely to be looking for version information regarding the application, but it is out of the way to allow normal user experience. Alternatively, the message may be displayed to the user when the user opens the application or a new window or tab in the application, showing a pop-up window or warning screen, or showing a message as part of the UI displaying the application. In one example, in addition to or in lieu of alerting the user, the application may report the issue to a central manager or server. In one example, the warning message may include a link to a Help Center page that explains the issue and possibly links to the latest offline installer. Otherwise, if an updater failure has not occurred, the process ends in step 206.

Figure 3:
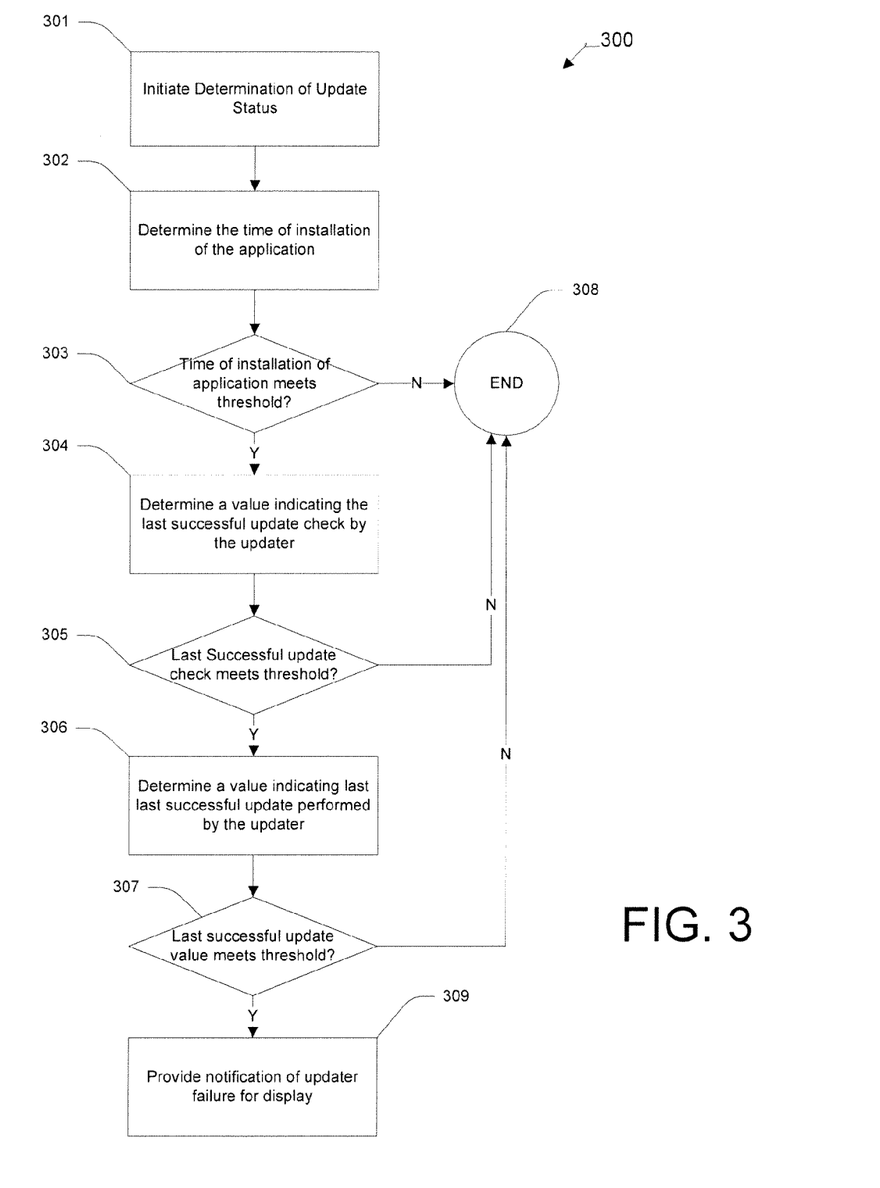
FIG. 3 illustrates a flow diagram of an example process for determining an update failure at an updater providing updates to a local application.

FIG. 3 illustrates a flow diagram of an example process 300 for determining an update failure at an updater providing updates to a local application. In step 301, the system initiates determination of update status of an application. In step 302, the system determines an installation time for the application. The installation time may refer to one or more of an installation time of the application, a new version of the application, a new update to the application and/or other updates, repairs or other actions which may be recognized by the system as an installation event. For example, the application or another application (e.g., the updater, a separate installer or other application) may write an "InstallTime" value (e.g., at the local storage of the application, the central location or other location accessible by the application). The application may determine the installation time value. The InstallTime value may consist of a time stamp or other indication of the time at which the last installation occurred. In another example, the InstallTime value may be implemented as a counter.

In step 303, the system determines if the installation time meets a threshold. For example, the system may determine a threshold (e.g., based on historical data, application type, user preferences and settings, system settings, etc.) associated with the installation time. The threshold may be a fixed value or may be dynamically determined based on various factors. The system may determine the threshold value and determine if the installation time meets the threshold value (e.g., is within a time period associated with the threshold, exceeds a specific amount of time). In one example, the threshold represents a time limit, before which a warning is not necessary. If, in step 303, the system determines that the installation time meets the threshold, the process ends in step 308. For example, if the system determines that the last installation is recent, the application may determine that there is no need to update the application and thus may conclude that there is no updater failure.

Alternatively, if the installation time does not meet the threshold (installation time is not within the threshold period of time, or that the difference between the current time and the installation time exceeds the threshold), then the system determines that enough time has lapsed since the last successful installation and proceeds to step 304. In step 304, the system determines a value indicating the last successful update check by the updater. In one example, the updater writes one or more time stamps to a central storage location. For example, the updater writes a time stamp of the current time to the LastCheckSuccess value whenever it has completed a successful update check for the application. In one example, the value is written when there is "no update" response or a successful update received (e.g., installer completed successfully) in response to an update check, either from the silent update worker or an on-demand/manual update. The LastCheckSuccess value is not updated if an invalid update response is received or if an update fails. The application can read this value and based on the difference between the value and the current time, can determine the time lapsed since a successful update check.

In step 305, the system determines if the value indicating the last successful update check meets a threshold. In one example, the application determines a threshold (e.g., a defined time or period of time) associated with the LastCheckSuccess time stamp. The threshold may be determined based on historical user information, user preferences, system preferences, historical update times, historical update frequency, and other similar information. In another example, the threshold may be a fixed value (e.g., a period of time). If, in step 305, the system determines that the length of time lapsed since the last successful update check meets the threshold (e.g., is within the period of time defined by the threshold, or below the threshold time limit), the process ends in step 308, concluding that there is no updater failure. Otherwise, if the LastCheckSuccess does not meet the threshold, the process may continue to step 306. In another instance, if the system determines that the LastCheckSuccess value does not meet the threshold, the application may continue to step 309 and provide notification of an updater failure. In one embodiment, the application may alert more frequently, persistently, and/or conspicuously as the difference between the threshold and LastCheckSuccess value increases.

In one example, LastCheckSuccess may be associated with an upper and lower threshold. In such instance, in step 305, the system first determines if the lower threshold is met by LastCheckSuccess value. If the lower threshold is not met, the system proceeds to step 309 and provides a notification of an updater failure. Otherwise, the system proceeds to determine if the LastCheckSuccess value meet an upper threshold. If the upper threshold is met, the system concludes that no updater failure has occurred and the process ends in step 308. Otherwise, if the upper threshold is not met, the process proceeds to step 306.

In step 306, the system determines a value indicating the last successful update of the application. In one example, the updater may write an "UpdateTime" value (e.g., time stamp) each time the application is successfully updated, which allows the application to further distinguish between the last time the application was updated and the last time a successful update check occurred. For example, an application may want to show a warning if it has been four weeks since an update even if it has only been a week since there was a successful update check. In some examples, there may be less tolerance for the successful update check value if it has been a long time since an update was applied which may indicate that it is more likely that an update is available. In such examples, the threshold may be defined to take into account this tolerance (e.g., the threshold may be defined based on a difference value adjusted based on the value of the last successful update). In one example, the threshold(s) may be defined based on a time difference (e.g., current time–difference threshold) or the value for the last successful update check may be converted to a time difference (e.g., current time–value) in order to allow a comparison of the threshold and the last successful update value.

In step 307, the system determines if the value indicating the last successful update of the application meets a threshold. The threshold may be determined based on similar criteria as described above with respect to the LastCheckSuccess threshold. If, in step 307, it is determined that UpdateTime value meets the threshold, the process continues to step 308 where the process ends, indicating a determination that the updater is functioning properly. Otherwise, the process continues to step 309. In one example, the determination of step 307 may be performed simultaneously with or prior to that of step 305. In one example, the UpdateTime threshold may include an upper and lower threshold similar to the threshold associated with the LastCheckSuccess threshold, and similar determinations as that of the LastCheckSuccess determination in step 305 may be performed with respect to the determination in step 307.

Furthermore, the application may use other data, such as how long it has been since the computer has been turned on, the last time the application was launched, last successful connection to the network, whether and when automatic update is enabled, automatic update schedule and other similar information.

The type of application may also be considered when determining thresholds or the point at which the system should warn the user. The application type may be defined by the sensitivity of the application, the update frequency, past security threats, past failures, or other similar information. For example, a browser application may inform the user immediately for security reasons while other applications may consider it safe to wait a while if the computer has been off for some time.

The above embodiments also work regardless of whether the updater is working (i.e. even if programmatic APIs are not available) and/or whether such APIs are available. In addition, no special distinction is necessary to differentiate between network connectivity issues and failures to apply updates.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
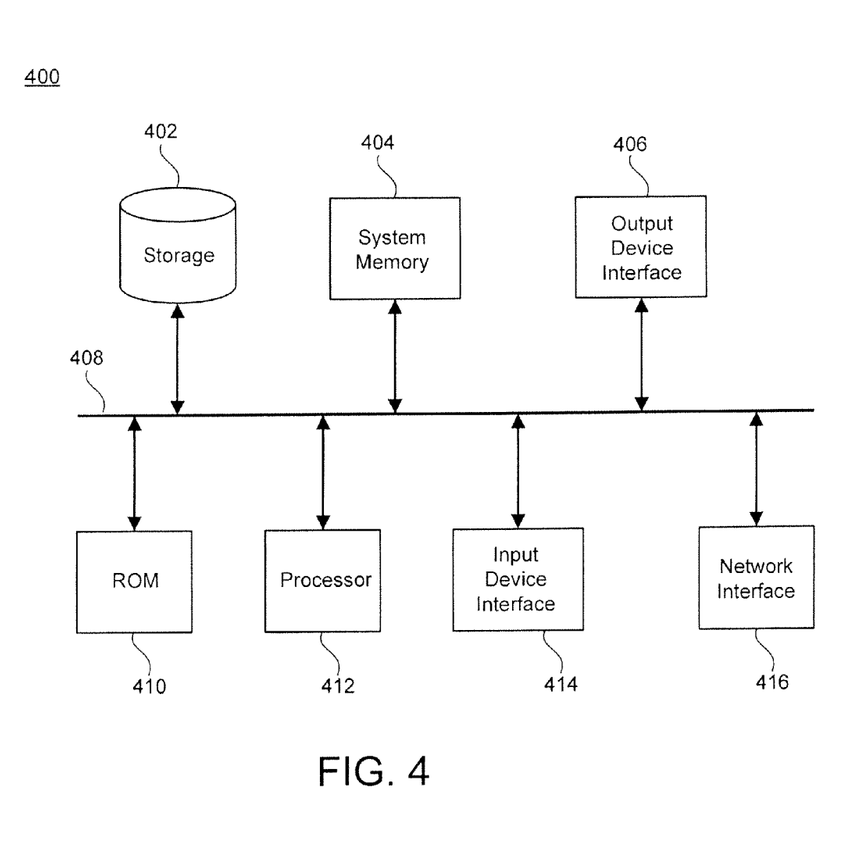
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for detecting a failure of an updater providing updates to a software application at the application. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for determining whether an update failure has occurred at an update mechanism and infrastructure with regard to a software application, the method comprising:
   receiving a request at an application to determine a status of an update mechanism and infrastructure ("updater") associated with the application;
   determining one or more values written by the updater at a location accessible by the application, the one or more values including one or more of a first value indicating when a last successful check for updates for the application was completed by the updater and second value indicating when a last successful update for the application was completed;
   determining a first threshold associated with the first value and a second threshold associated with the second value;
   determining if the first value meets the first threshold;
   determining if the second value meets the second threshold if the first value does not meet the first threshold;
   determining, at the application, based at least in part on whether the second value meets the second threshold, if an update failure has occurred at the updater, wherein the update failure comprises the updater having problems detecting or applying updates for the application; and
   generating a notification when it is determined that the update failure has occurred.

2. The method of claim 1, wherein the updater is external to the application.

3. The method of claim 1, wherein the location is remote from one or both of the application and the updater.

4. The method of claim LEES, further comprising:
   determining that the update failure has occurred if the second value does not meet the second threshold.

5. The method of claim 1, wherein the first threshold and second threshold are each determined based at least on one or more of user information, user preferences, system preferences, historical update times, or historical update frequency.

6. The method of claim 1, wherein the first value comprises a time stamp of a last time the updater performed a successful check for updates for the application.

7. The method of claim 1, wherein the second value comprises a time stamp of a time the updater provided the application with a successful update.

8. The method of claim 1, wherein the first threshold comprises an upper threshold and determining if the update failure has occurred comprises:
determining a lower threshold associated with the first value;
determining if the first value meets the lower threshold;
determining if the first value meets the upper threshold when it is determined that the first value does not meet the lower threshold;
determining if the second value meets the second threshold if it is determined that the first value does not meet the upper threshold; and
determining that the update failure has occurred if the second value does not meet the second threshold.

9. The method of claim 1, further comprising:
determining a third value indicating when the application was installed;
determining if the third value meets a threshold; and
determining that the update failure has not occurred if the third value meets the threshold.

10. The method of claim 1, further comprising:
determining one or more additional values regarding the application, the one or more additional values including one or more of when a client device at which the application is running was turned on or when the client device established a successful connection to a network,
wherein the determining the update failure has occurred is further based at least on one or more of the one or more additional values.

11. The method of claim 1, further comprising:
providing the notification for display to a user at the application.

12. The method of claim 11, further comprising:
wherein the notification includes a link facilitating performing a manual update.

13. A system for determining whether an update failure has occurred at an update mechanism and infrastructure with regard to an application, the system comprising:
one or more processors; and
a machine-readable medium comprising instructions stored therein, which when executed by the processors, cause the processors to perform operations comprising:
determining a first value written by an update mechanism and infrastructure ("updater") at a first location accessible by an application, the first value indicating when a last successful check for updates for the application was completed at the updater, wherein the updater is external to the application;
determining, at the application, whether the first value meets a first set of threshold criteria, the first threshold criteria including at least one threshold value;
determining a second value written by the updater at the first location, the second value indicating when a last successful update for the application was completed;
determining, at the application, if the second value meets a second threshold value, if it is determined that the first value does not meet the at least one threshold value; and
determining, at the application, that an update failure has occurred at the updater if the second value does not meet the second threshold value, wherein the update failure comprises the updater having problems detecting or applying updates for the application; and
generating a notification when it is determined that the update failure has occurred.

14. The system of claim 13, wherein the first location is remote from one or both of the application and the updater.

15. The system of claim 13, wherein the at least one threshold and the second threshold are each determined based at least in part on one or more of user information, user preferences, system preferences, historical update times, or historical update frequency.

16. The system of claim 13, wherein the first value comprises a time stamp of a last time the updater performed a check for updates for the application that resulted in receiving a no update response or an update for the application.

17. The system of claim 13, wherein the second value comprises a time stamp of a last time the updater provided the application with a successful update.

18. The system of claim 13, the operations further comprising:
determining a third value indicating when the application was installed;
determining if the third value meets a threshold; and
generating the notification if the third value does not meet the threshold.

19. A machine-readable medium comprising instructions stored therein, which when executed by a machine, cause the machine to perform operations comprising:
receiving a request at a software application to determine a status of an update mechanism and infrastructure ("updater") associated with the application;
determining a first value indicating when the application was installed;
determining if the first value meets a first threshold;
determining a second value written by the updater at a first location accessible by an application if the first value does not meet the first threshold, the second value indicating when a last successful check for updates for the application was completed at the updater, wherein the updater is external to the application;
determining, at the application, whether the second value meets a second threshold;
determining a third value written by the updater at the first location if it is determined that the second value does not meet the second threshold, the third value indicating when a last successful update for the application was completed;
determining, at the application, if the third value meets a third threshold; and
determining, at the application, that an update failure has occurred at the updater if the third value does not meet the third threshold, wherein the update failure comprises the updater having problems detecting or applying updates for the application; and
generating a notification when it is determined that the update failure has occurred.

* * * * *